United States Patent
Choi et al.

(10) Patent No.: US 8,069,332 B2
(45) Date of Patent: Nov. 29, 2011

(54) DEVICE AND METHOD FOR EXTRACTING MEMORY DATA

(75) Inventors: Myeong Ryeol Choi, Daejeon (KR); Yo Sik Kim, Daejeon (KR); Sangseo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 745 days.

(21) Appl. No.: 12/208,467

(22) Filed: Sep. 11, 2008

(65) Prior Publication Data

US 2009/0164740 A1    Jun. 25, 2009

(30) Foreign Application Priority Data

Dec. 20, 2007  (KR) ................. 10-2007-0134327
May 6, 2008    (KR) ................. 10-2008-0041659

(51) Int. Cl.
*G06F 12/10* (2006.01)
(52) U.S. Cl. ........................ 711/203; 711/151
(58) Field of Classification Search .................. 711/203
See application file for complete search history.

(56) References Cited

U.S. PATENT DOCUMENTS

2005/0193173 A1   9/2005 Ring et al.
2009/0138887 A1*  5/2009 Uehara et al. ................. 718/104

FOREIGN PATENT DOCUMENTS

JP    08-016454 A    1/1996
JP    2000-132451 A  5/2000

OTHER PUBLICATIONS

Brian D. Carrier$^{a*1}$ et al; "A hardware-based memory acquisition procedure for digital investigations" Digital Investigation (2004) 1, 50-60.

* cited by examiner

*Primary Examiner* — John Lane
(74) *Attorney, Agent, or Firm* — Ladas & Parry LLP

(57) ABSTRACT

A device and method for extracting data stored in a volatile memory are provided. In particular, a memory-data extracting device and method for ensuring integrity of data extracted from a volatile memory installed in a computer are provided. A memory-data extracting module extracts data stored in a memory. A module loader loads the memory-data extracting module in a kernel region of the memory and sets a priority of the loaded memory-data extracting module to be higher than priorities of kernel processors loaded in the memory. Task switching can be prevented in the course of extracting memory data by loading a process for extracting memory data in a kernel region and setting a priority of the loaded process to be higher than priorities of other kernel processes, thereby ensuring the integrity of data extracted from a non-volatile memory.

14 Claims, 1 Drawing Sheet

DEVICE AND METHOD FOR EXTRACTING MEMORY DATA

CROSS-REFERENCE TO RELATED APPLICATION

This application claims priority to and the benefit of Korean Patent Application No. 2007-134327, filed Dec. 20, 2007, and No. 2008-41659, filed May 6, 2008, the disclosure of which is incorporated herein by reference in its entirety.

BACKGROUND

1. Field of the Invention

The present invention relates to a device and method for extracting data stored in a volatile memory and, more particularly, to a memory-data extracting device and method for ensuring integrity of data extracted from a volatile memory installed in a computer.

2. Discussion of Related Art

In order to effectively take action against crimes using electronic equipment, digital forensic targets for evidence acquisition and analysis are gradually extending to computers, mobile phones, and personal digital assistants (PDAs). In particular, when the digital forensic target is a computer, useful evidence may be collected from a memory of a volatile storage medium as well as a hard disk of a non-volatile storage medium.

Methods for collecting data stored in a volatile memory include a first method for forcibly generating an error in order to use a crash dump file in which memory data is automatically stored by an operating system (OS) when a serious system error occurs, a second method for directly extracting memory data using an external hardware device capable of directly accessing a memory, and a third method using a memory dump program for extracting data stored in a memory using a memory interface provided by the OS.

In the method for forcibly generating an error, there is a trouble of the format of the crash dump file having to be converted for a specific purpose of a digital forensic process since the memory data is stored in the crash dump file on the basis of a unique OS format. In the method for extracting memory data using an external hardware device, there are drawbacks of high cost since memory imaging dedicated hardware is required and inapplicability to a computer that is incapable of supporting corresponding hardware. On the other hand, the method using a memory dump program is most widely used since it has the merits of enabling the format of an image file to be arbitrarily changed, if needed, and it does not require additional hardware.

In general, such a memory dump program operates as a user process executed in a user region of a memory. If the memory dump program runs simultaneously with other user processes, data stored in the memory may be changed in the course of data extraction when task switching occurs in operation of the memory dump program.

For example, if task switching occurs when the memory dump program extracts part of the memory data, another user process may alter data of a memory region that has not yet been extracted by the memory dump program. In this case, even though the memory dump program stores the remaining memory data after task switching, a temporal mismatch may occur on the stored memory data.

Accordingly, a conventional memory-data extracting device such as the memory dump program has a drawback in that the integrity of collected evidence, which is the most basic requirement of the digital forensic system, may not be ensured. In particular, when a user process newly runs or ends in the course of extracting the memory data, and content of a material structure of the OS is changed, evidence analysis is impossible since ranges of a process region, a thread region, and a memory region may not be identified.

SUMMARY OF THE INVENTION

The present invention provides a device and method for extracting memory data that can ensure integrity of the extracted memory data by preventing task switching in the course of extracting the memory data.

According to an aspect of the present invention, there is provided a device for extracting memory data, including: a memory-data extracting module that extracts data stored in a memory; and a module loader that loads the memory-data extracting module in a kernel region of the memory and sets a priority of the loaded memory-data extracting module to be higher than priorities of kernel processors loaded in the memory.

According to another aspect of the present invention, there is provided a method for extracting memory data, including: loading a memory-data extracting module in a kernel region of a memory; setting a priority of the memory-data extracting module to be higher than priorities of kernel processes loaded in the memory; converting a physical memory address of a memory region where data to be extracted is stored into a virtual memory address; extracting the data stored in the memory using the virtual memory address; and storing the extracted data in a storage device.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
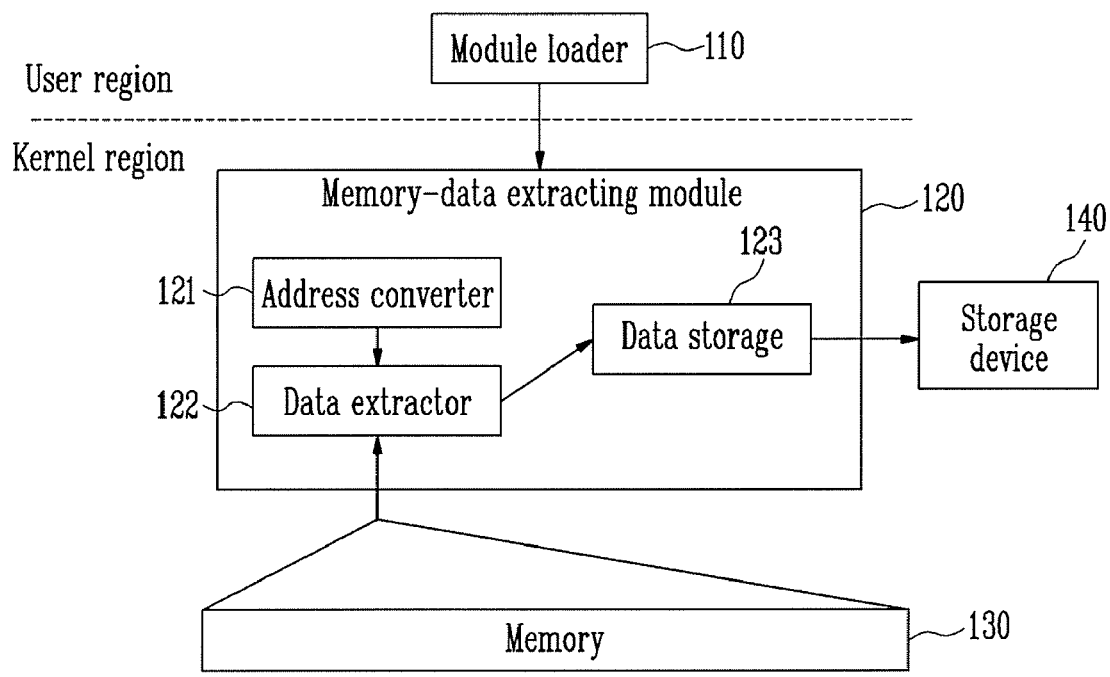
FIG. 1 is a block diagram showing a structure of a device for extracting memory data according to an exemplary embodiment of the present invention.

FIG. 1 is a block diagram showing a structure of a device for extracting memory data according to an exemplary embodiment of the present invention.

Referring to FIG. 1, the memory-data extracting device according to the exemplary embodiment of the present invention includes a module loader 110 and a memory-data extracting module 120.

The module loader 110 is a user processor operating in a user region of a memory and serves to load the memory-data extracting module 120 for extracting data stored in a memory 130 in a kernel region of the memory. At this time, the module loader 110 can adjust a priority of the memory-data extracting module 120 loaded in the kernel region.

In general, the user process cannot directly access system resources and performs a task using system resources through the kernel process operating in the kernel region of the memory. That is, the user process in operation can load at least one kernel process. And a processor can execute only one kernel process at once. Therefore, the kernel process is a substantial minimum unit of task switching.

On the other hand, an OS such as Windows or Linux usually sets priorities of kernel processes in order to determine a process to be preferentially executed among kernel processes simultaneously loaded in the kernel region. For example, in general, processes requiring urgent processing such as a hardware interrupt processing routine have the highest priority. A task scheduler of an OS first executes a kernel process having the highest priority among the currently loaded kernel processes according to scheduling policy.

Accordingly, the module loader 110 loads the memory-data extracting module 120 in the kernel region and sets the priority of the loaded memory-data extracting module 120 to be higher than those of the kernel processes loaded in the memory, thereby preventing task switching while the memory-data extracting module 120 extracts the memory data. In an exemplary embodiment, the module loader 110 can set the priority of the memory-data extracting module 120 to the highest priority among the priorities of the kernel processes provided by the OS.

The memory-data extracting module 120 serves as the kernel process to be executed in the kernel region and includes an address converter 121, a data extractor 122, and a data storage 123.

The address converter 121 converts a memory address necessary to access the memory data and provides the converted address to the data extractor 122. In general, a memory address used by the kernel process is a virtual memory address. In order to access data stored in a specific physical memory address, the kernel process requires the virtual memory address corresponding to the physical memory address. (For example, a physical memory address 0x000A1234 can correspond to a virtual memory address 0x00001234.) Accordingly, the address converter 121 provides the data extractor 122 with the virtual memory address corresponding to the physical memory address of the memory region from which data is to be extracted. The data extractor 122 can access data stored in a corresponding region using the virtual memory address provided by the address converter 121.

At this time, the address converter 121 can perform conversion between the physical memory address and the virtual memory address using an address conversion service provided by the OS. For example, the address converter 121 can perform the address conversion using ZwMapUserPhysicalPages of a kernel API of a Windows NT or an ioremap of a kernel API of Linux.

The data extractor 122 extracts data stored in the memory 130 on the basis of a physical address space size of the memory stored in the OS and the virtual memory address provided by the address converter 121. In an exemplary embodiment, the data extractor 122 can extract data stored in the memory 130 using a memory input/output interface provided by the OS. For example, when Windows is used as the OS, the data extractor 122 can access the memory using a '\\.\PhysicalMemory' file or a '\\.\DebugMemory' file. When Linux is used as the OS, the data extractor 122 can access the memory using a '/dev/mem' file or a '/proc/kcore' file.

The data storage 123 stores memory data extracted by the data extractor 122 in a storage device 140. The data storage 123 stores the memory data using a file input/output interface within a kernel provided by the OS without loading an additional file input/output process, thereby preventing task switching to a user region of the memory. For example, when a Windows NT is used as the OS, the data storage 123 can store the memory data in the storage device 140 in the form of a file using ZwReadFile and ZwWriteFile of kernel APIs. When Linux is used as the OS, the data storage 123 can store the memory data using generic_file_read and generic_file_write. In an exemplary embodiment, the data storage 123 can store the extracted memory data in the form of an image file.

When the memory-data extracting module 120 is in operation, data stored in a memory address region where the memory-data extracting module 120 is loaded can be continuously changed. The data storage 123 additionally stores an address of the memory region where the memory-data extracting module 120 is loaded, such that the data stored in the memory region can be excluded from an analysis target in a later evidence analysis process. In an exemplary embodiment, the storage device 140 can include a non-volatile storage medium such as a hard disk.

Figure 2:
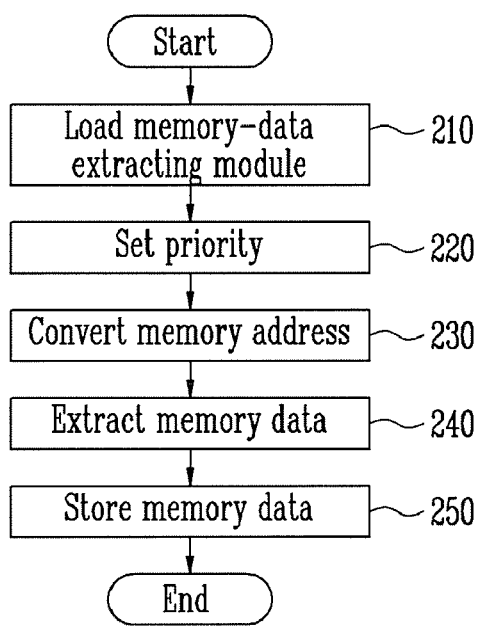
FIG. 2 is a flowchart showing a method for extracting memory data according to an exemplary embodiment of the present invention.

FIG. 2 is a flowchart showing a method for extracting memory data according to an exemplary embodiment of the present invention.

Referring to FIG. 2, the module loader loads the memory-data extracting module in a kernel region of the memory (210) and sets a priority of the memory-data extracting module to be higher than those of kernel processes loaded in the memory (220). In an exemplary embodiment, the module loader can set the priority of the memory-data extracting module to the highest priority among priorities of kernel processes provided by the OS.

Next, the address converter of the memory-data extracting module converts a physical memory address of a memory region for collecting data into a virtual memory address and then transfers the virtual memory address to the data extractor (230). In an exemplary embodiment, the address converter can perform conversion between the physical memory address and the virtual memory address using an address conversion service provided by the OS.

The data extractor extracts data stored in the memory using a physical address space size of the memory stored in the OS and the virtual memory address provided by the address converter (240). In an exemplary embodiment, the data extractor can extract data stored in the memory using a memory input/output interface provided by the OS.

Finally, the data storage stores the memory data extracted by the data extractor in the storage device (250). At this time, the data storage can store the memory data using a file input/output interface within a kernel provided by the OS without loading an additional file input/output process. In an exemplary embodiment, the data storage can store the extracted memory data in the form of an image file. In another exemplary embodiment, the data storage can additionally store an address of the memory region where the memory-data extracting module is loaded.

The present invention can prevent task switching in the course of extracting memory data by loading a process for extracting memory data in a kernel region and setting a priority of the loaded process to be higher than priorities of other kernel processes, thereby ensuring the integrity of data extracted from a non-volatile memory.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A device for extracting memory data, comprising:
a memory-data extracting module that extracts data stored in a memory; and
a module loader that loads the memory-data extracting module in a kernel region of the memory and sets a priority of the loaded memory-data extracting module to be higher than priorities of kernel processors loaded in the memory wherein the memory-data extracting module comprises:
an address converter that converts a physical memory address of the data stored in the memory into a virtual memory address;
a data extractor that extracts the data stored in the memory using the virtual memory address; and
a data storage that stores the extracted data in a storage device.

2. The device of claim 1, wherein the module loader sets the priority of the memory-data extracting module to a highest priority among priorities of kernel processors provided by an operating system.

3. The device of claim 1, wherein the address converter converts the physical memory address into the virtual memory address using an address conversion service provided by an operating system.

4. The device of claim 1, wherein the data extractor extracts the data stored in the memory on the basis of a physical address space size of the memory stored in an operating system.

5. The device of claim 1, wherein the data extractor extracts the data stored in the memory using a memory input/output interface provided by an operating system.

6. The device of claim 1, wherein the data storage stores the extracted data in the storage device using a file input/output interface within a kernel provided by an operating system.

7. The device of claim 1, wherein the data storage stores an address of a memory region where the memory-data extracting module is loaded.

8. A method for extracting memory data, comprising:
loading a memory-data extracting module in a kernel region of a memory;
setting a priority of the memory-data extracting module to be higher than priorities of kernel processes loaded in the memory;
converting a physical memory address of a memory region where data to be extracted is stored into a virtual memory address;
extracting the data stored in the memory using the virtual memory address; and
storing the extracted data in a storage device.

9. The method of claim 8, wherein the setting the priority of the memory-data extracting module comprises:
setting the priority of the memory-data extracting module to a highest priority among priorities of kernel processors provided by an operating system.

10. The method of claim 8, wherein the converting the physical memory address of the memory region where the data to be extracted is stored into the virtual memory address comprises:
converting the physical memory address into the virtual memory address using an address conversion service provided by an operating system.

11. The method of claim 8, wherein the extracting the data stored in the memory comprises:
extracting the data stored in the memory on the basis of a physical address space size of the memory stored in an operating system.

12. The method of claim 8, wherein the extracting the data stored in the memory comprises:
extracting the data stored in the memory using a memory input/output interface provided by an operating system.

13. The method of claim 8, wherein the storing the extracted data in the storage device comprises:
storing the extracted data in the storage device using a file input/output interface within a kernel provided by an operating system.

14. The method of claim 8, further comprising:
storing an address of a memory region where the memory-data extracting module is loaded.

* * * * *